United States Patent [19]

ver Loren van Themaat

[11] Patent Number: 4,916,433

[45] Date of Patent: Apr. 10, 1990

[54] PROTECTION OF PROPERTY

[76] Inventor: Hendrik M. ver Loren van Themaat, 314 Nevade Crescent, Faerie Glen, Pretoria, South Africa

[21] Appl. No.: 267,980

[22] Filed: Nov. 7, 1988

[30] Foreign Application Priority Data

Nov. 6, 1987 [ZA] South Africa ....................... 87/8356

[51] Int. Cl.[4] ............................................ H04B 11/00

[52] U.S. Cl. .................................. 340/550; 340/566; 256/12

[58] Field of Search ............... 340/566, 565, 541, 665, 340/550; 116/75; 403/97; 256/12

[56] References Cited

U.S. PATENT DOCUMENTS

| | | | |
|---|---|---|---|
| 1,703,189 | 4/1928 | Getz | 403/97 |
| 3,803,548 | 4/1974 | Skujins | 340/566 |
| 4,005,397 | 1/1977 | Blair | 340/566 |
| 4,676,485 | 6/1987 | Ciordinik | 256/12 |
| 4,764,756 | 8/1988 | Van Thematt | 340/566 |

FOREIGN PATENT DOCUMENTS

86/3018 4/1986 South Africa .

*Primary Examiner*—Joseph A. Orsino
*Assistant Examiner*—Geoff L. Sutcliffe
*Attorney, Agent, or Firm*—Kenyon & Kenyon

[57] ABSTRACT

A security installation includes a primary barrier section protruding upwardly from a substrate and extending along the substrate in a first direction, a secondary barrier section protruding from, and extending along, the primary section, with the secondary barrier section being movable with respect to the primary barrier section in a second direction extending transversely to the first direction, and sensing means for sensing movement in the second direction of at least a portion of the secondary barrier section relative to the primary barrier section.

31 Claims, 5 Drawing Sheets

PROTECTION OF PROPERTY

This invention relates to the protection of property. It relates in particular to a security installation.

According to a first aspect of the invention there is provided a security installation which includes a primary barrier section protruding upwardly from a substrate and extending along the substrate in a first direction;

a secondary barrier section protruding from, and extending along, the primary barrier section, with the secondary barrier section being movable with respect to the primary barrier section in a second direction extending transversely to the first direction; and sensing means for sensing movement in the second direction of at least a portion of the secondary barrier section relative to the primary barrier section.

The sensing means may comprise warning signal emission means for emitting a warning signal on the secondary barrier section moving in the second direction relative to the primary barrier section; and detection means for detecting a warning signal emitted by the warning signal emission means.

The warning signal emission means may be adapted to issue distinct or spaced sounds and/or vibrations as the secondary barrier section moves relative to the primary barrier section in the second direction, with the detection means including a sound and/or a vibration signal sensing device.

The security installation may include signal-processing means for receiving and further processing the signal(s) sensed by the signal sensing device.

The signal sensing device and signal processing means may be those described in U.S. Pat. No. 4,764,756 which is hence incorporated herein by reference. The signal sensing device may hence be a microphonic cable extending along at least one of the barrier sections, and the microphonic cable may comprise at least two elongate co-extensive electrical conductors capable of sensing vibrations, converting these vibrations into electrical signals and transmitting the electrical signals. The signal-processing means can then be electrically connected to at least one pair of ends of the conductors. The signal-processing means may include normalizing means for normalizing the electrical signals, and a comparator comparing the normalized signals with previously normalized known signals, thereby to identify the source of the signals transmitted along the cable, with identification of signals as emanating from the warning signal emission means being indicative of an alarm condition.

The warning signal emission means may include a first component mounted to the primary barrier section, and a second component mounted to the secondary barrier section, with the second component being pivotal relative to first component about a pivotal axis extending in the first direction, and with the warning signals being emitted as the second component pivots relative to the first component.

The warning signal emission means may also include a plurality or set of teeth on the second component and spaced circumferentially about the pivotal axis; at least one complementary teeth-engaging member, on the first component; and bias means biassing the teeth-engaging member of the first component and the teeth of the second component into engagement with each other.

In one embodiment of the invention a pair of the teeth-engaging members in the form of teeth, e.g. spaced diametrically apart on opposite sides of the pivotal axis, may be provided on the first component. In another embodiment of the invention, a plurality of the members, in the form of a complementary set of teeth spaced circumferentially about the pivotal axis, may be provided on the first component.

Hence, sufficient force must be imparted to the secondary barrier section to overcome the bias of the bias means and permit the sets of teeth to pivot relative to each other, ratchet-fashion, to enable the secondary barrier section to move. As the sets of teeth move, vibration signals are emitted, as well as clicking noises or signals.

The secondary barrier section may extend upwardly from the first barrier section and may comprise a plurality of upright supports, spaced apart along the primary barrier section, and a plurality of vertically spaced tie members extending between the upright supports. A warning signal emission means may be associated with at least some of the upright supports, with the second components of the warning signal emission means in each case being attached to the upright support.

The secondary barrier section may also comprise a pair of transverse supports projecting transversely respectively on opposite sides of at least some of the upright supports, and a plurality of tie members spaced transversely apart, extending between the transverse supports.

The warning signal emission means may further include limiting means for limiting the extent to which the second components can pivot relative to the first components. The limiting means may be adapted to permit pivoting of the upright supports up to 20° off the vertical.

At least some of the supports may have some resilience so that, when at least one second component, and hence its associated support, is in its position of maximum pivoting as dictated by the limiting means, the secondary barrier section in proximity to that support becomes relatively unstable due to the resilience in the support and the tension/elasticity in the tie members. Hence, on a load being applied to the secondary barrier section in proximity to one of the supports, e.g. by a person attempting to breach the installation, that support will pivot relative to the primary section as hereinbefore described, thereby causing emission of warning signals and resulting in the relative instability of the second barrier section. In this fashion, progress of the would-be intruder is hindered or prevented.

The installation may include coils of razor tape and/or DANNERT (trade name) wire attached to the secondary section.

The upright and transverse supports may be of elongate form, and the teeth and bias means may be such that pivoting of the second component relative to the first component occurs on a load of at least 20 kg being applied to a free end of one of the supports, in the second direction. Depending on the spacing between the supports and the tension in the tie members, adjacent supports may also possibly pivot at least to a degree, while the secondary barrier will become relatively unstable, bouncy or resiliently flexible in the vicinity of that support.

The invention extends also to warning signal emission means for a security installation comprising a primary barrier section protruding upwardly from a substrate end extending along the substrate in a first direction, and a secondary barrier section protruding from, and extending along, the primary barrier section, the warning signal emission means comprising a first component mountable to one of the barrier sections;

a second component mountable to the other of the barrier sections, and being pivotal relative to the first component about a pivotal axis;

a plurality of teeth on the second component and spaced apart circumferentially about the pivotal axis;

at least one complementary teeth-engaging member on the first component; and bias means biassing the teeth of the first component and the member of the second component into engagement with each other.

The invention will now be described by way of example, with reference to the accompanying diagrammatic drawings.

Figure 1:
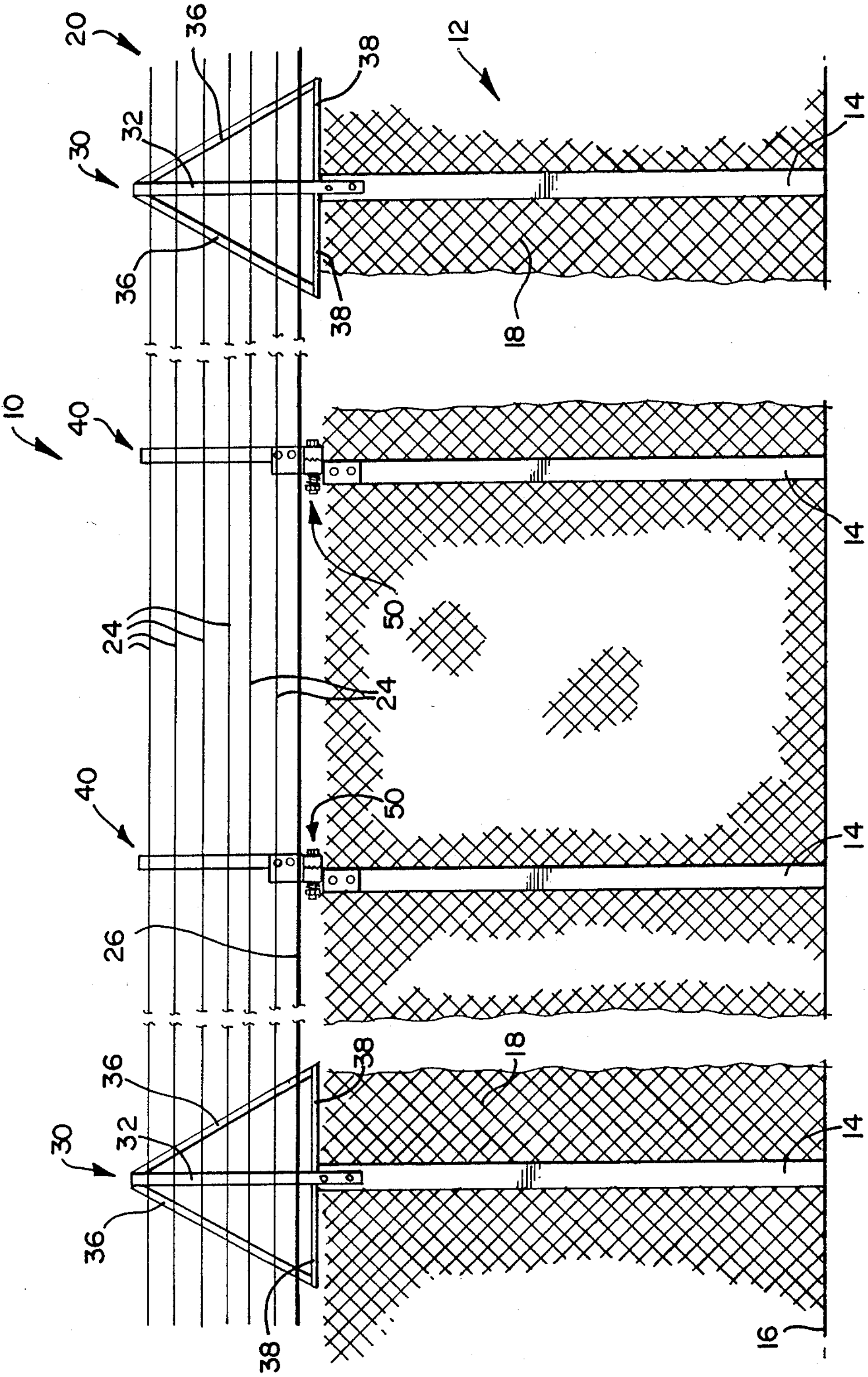
FIG. 1 shows a front view of part of a security installation according to one embodiment of the invention.
Figure 2:
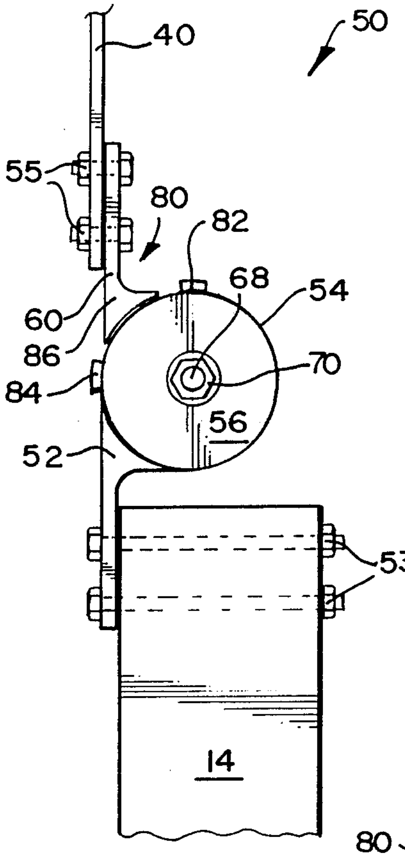
FIG. 2 shows a side view of one of the warning signal emission means of FIG. 1.
Figure 3:
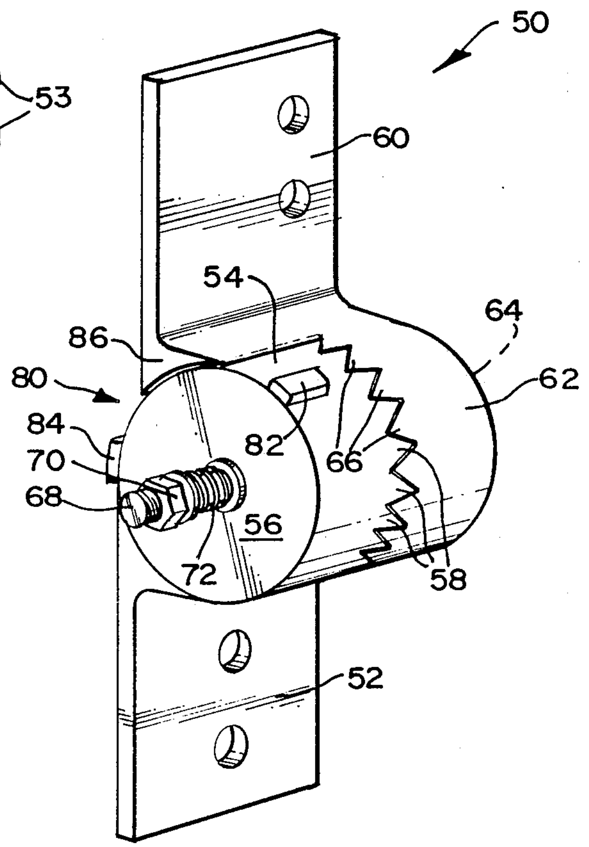
FIG. 3 shows a three-dimensional view of the warning signal emission means of FIG. 2.

Referring to FIGS. 1 to 3 of the drawings, reference numeral 10 generally indicates a security installation in accordance with one embodiment of the invention.

The security installation 10 includes a primary barrier section, generally indicated by reference numeral 12. The barrier section 12 comprises a plurality of spaced posts 14 extending substantially vertically upwardly from the ground 16. Wire mesh 18 spans the gaps between adjacent posts 14. The barrier section 12 may be about two meters high and extends in a first direction.

The installation 10 also includes a secondary barrier section, generally indicated by reference numeral 20, protruding upwardly from and extending along the primary barrier section 12.

The secondary barrier section 20 comprises a plurality of primary supports 30, spaced apart from each other, as well as secondary supports, generally indicated by reference numeral 40, also spaced apart from each other. Each of the supports 40 is secured to one of the posts 14 of the primary barrier section 12 by means of warning signal emission means, generally indicated by reference numeral 50.

As can best be seen in FIGS. 2 and 3, each of the means or devices 50 comprises a first component 52 secured to the post 14 by means of nuts and bolts 53. A round cylindrical component 54, having an end-face 56, is fast with the component 52. The axis of the cylindrical component 54 extends in the first direction, and it is provided with a plurality of circumferentially spaced longitudinally extending teeth 58 protruding in the first direction. The devices 50 also include a second component 60 attached to the supports 40 by means of nuts and bolts 55. A round cylindrical component 62, having an end-face 64, is fast with the component 60. The cylindrical component 62 is also provided with a plurality of circumferentially spaced longitudinally extending teeth 66, also protruding in the first direction and being complementary to the teeth 58. The components 54, 62 are secured together by means of an axially extending bolt 68 and a complementary nut 70, with bias means in the form of a spring 72 extending around the bolt 68. The spring 72 is located between the nut 70 and the end-face 56. Hence, the spring 72 biasses the teeth 58 of the component 54 into engagement with the teeth 66 of the component 62. However, on sufficient force being applied to the component 60, as hereinafter described, the component 62 can be urged to rotate relative to the component 54, against the interlocking of the teeth 66, 58 and the bias of the spring 72, i.e. in ratchet-like fashion, thereby causing an aural and a vibration warning signal to be emitted. The purpose of this signal will be described in more detail here under. Instead of the spring 72, any other suitable biassing means, e.g. disc washers, can be used.

Each of the devices 50 also includes limit means, generally indicated by reference numeral 80. The limit means 80 comprises a pair of circumferentially spaced elongate stops 82, 84 protruding from the component 54, as well as an extension 86 to the component 60. The extension 86 is arranged so that it extends along the component 54 and is normally located more or less midway between the stops 82, 84, as shown in the drwaings, i.e. with the component 60 extending vertically upwardly. However, when the component is pivoted about 20° off the vertical, in either direction, one of the stops 82, 84 will be engaged by the extension 86, thereby preventing further rotation of the component 60.

The secondary supports 40 may each comprise a length of spring steel which extends substantially vertically upwardly, and may be spaced about 3 meters apart. The secondary supports 40 are thus of planar form. Instead, they can be of circular cross-section, e.g. having a diameter of about 1 cm.

Each primary support 30 comprises an elongate planar member 32 of spring steel which is bolted directly to the upper end of one of the posts 14. The primary supports 30 may be spaced about 50 meters apart. The planar member 32 extends substantially vertically upwardly, and its plane extends in the first direction i.e. parallel to the plan of the primary barrier section 12. The planar member 32 may protrude between −0.25 and 1.0 meters above the top of the primary barrier section 12, e.g. about 0.5 to 0.7 meters above it. The member 32 may typically be about 5 cm wide and about 0.3 cm thick. Each primary support 30 also comprises bases 38 extending outwardly from opposite sides of the member 32, at or near its lower end, in the first direction. A strengthening strut 36 interconnects the free end of each of the bases 38 to the member 32, at or near its upper end. The struts 36 are also of spring steel, and are also substantially planar, i.e. they lie in the same plane as the members 32.

The secondary barrier section 20 also includes a plurality of horizontally extending tensioned tie members, which may be strands of steel tie or span wires 24, spaced apart from one another vertically. The steel wires 24 pass alongside the supports 40 and are attached thereto by means of tie elements, e.g. wires (not shown).

The wires 24 are also attached to the members 32 of the primary supports 30. Instead of steel wires 24, barbed wires can be used, if desired.

A microphonic or co-axial cable 26 for picking up the aural and/or vibration signals emitted by the means 50, is attached to the lowermost strand of wire 24. However, the cable can instead, or additionally, be attached to any of the other strands of wire 24, and/or to the primary barrier section 12. The microphonic cable 26 is connected to suitable signal processing means, as described in more detail hereunder with reference to FIG. 7 and which is similar to that described in U.S. Pat. No. 4 764 756 incorporated herein by reference. However, the signal processing means can instead be any other suitable signal processing means responsive to amplitudes and/or frequencies of signals transmitted along the cable 26.

The supports 40 can yield, due to the means 50, in a second direction, i.e. perpendicular to the plane of the primary barrier section 12 on a sufficient load being applied to the secondary or upper barrier section 20. They can also yield in the first direction, i.e. parallel to the primary barrier section 12. In contrast, the members 32 cannot readily yield in the first direction since they are of planar form and are supported by the struts 36. However, the members 32 can yield resiliently in the second direction. Hence, the strands of wire 24 can be tensioned to a substantial degree.

In use, on an intruder attempting to penetrate the installation 10 by climbing up one of the posts 14 and supports 40, the support 40 will yield progressively under the mass of the intruder, by the component 62 (see FIG. 3) rotating to the component 54, against the bias of the spring 72. As teeth 66, 58 of the components 62, 54 move relative to each other, they will emit vibrations and, probably, a clicking noise. These signals will be picked up by the microphonic cable 26 and processed by the processing means, which will thus identify the signal as being a 'hostile' signal as well as determine the position of the signal. The attempted breach can thus be investigated further.

However, at the same time the wires 24 will also be tensioned as the support 40 yields. The limit means 80 of the device 50 limits the degree to which the component 60 can yield from the vertical to about 20°, as hereinbefore described, on the application of a load in excess of 30 kg to the upper end of the support 40. On the component 60 reaching its maximum degree of yield, the barrier section 20 becomes unstable in proximity to said support 40 due to the resilience of the support 40 and the tension in the wires 24. The tension in the wires 24, especially the uppermost strand of wire 24, will then be sufficient so that substantial deformation of the support 40 will be hindered, even with a relatively heavy load, e.g. a load of 90 kg or more, being applied thereto. It will be noted that as the particular support 40 yields, adjacent supports 30, 40 may also yield slightly due to the tension in the wires. This enhances instability of the upper section 20, i.e. it becomes even more resiliently flexible or 'bouncy', and will thus not provide a ready hand or foot hold for the intruder. Similarly, should an intruder climb up one of the posts 14 to which one of the supports 30 is attached, the support 30 will yield in the second direction, thereby also causing an adjacent support 40 to yield, as hereinbefore described, thus activating the device 50 of the support 40 to issue the vibration signal.

Should an intruder attempt to breach the installation in any other manner, e.g. by cutting the mesh 18 and/or the wires 24, then vibration and possibly even noise signals, capable of being sensed by the cable 26, will be emitted.

If desired, rolls or coils of razor tape and/or barbed wire, such as that available locally under the trade name DANNERT (not shown) may be attached to at least one side of the secondary section 20.

It is believed that the security installation 10 cannot readily be breached by an intruder, due to the progressive movement of the supports 40 and the resilient flexibility or 'bounciness' of the top section. Furthermore, attempted intrusion is readily detected by means of the microphonic cable 26, and the position of the attempted intrusion easily fixed. The means 50 also provide a relatively inexpensive manner of providing an alarm or detection facility. Furthermore, the deformed secondary or upper section 20 provides an effective visual indication of the point or zone of attempted intrusion.

Figure 4:
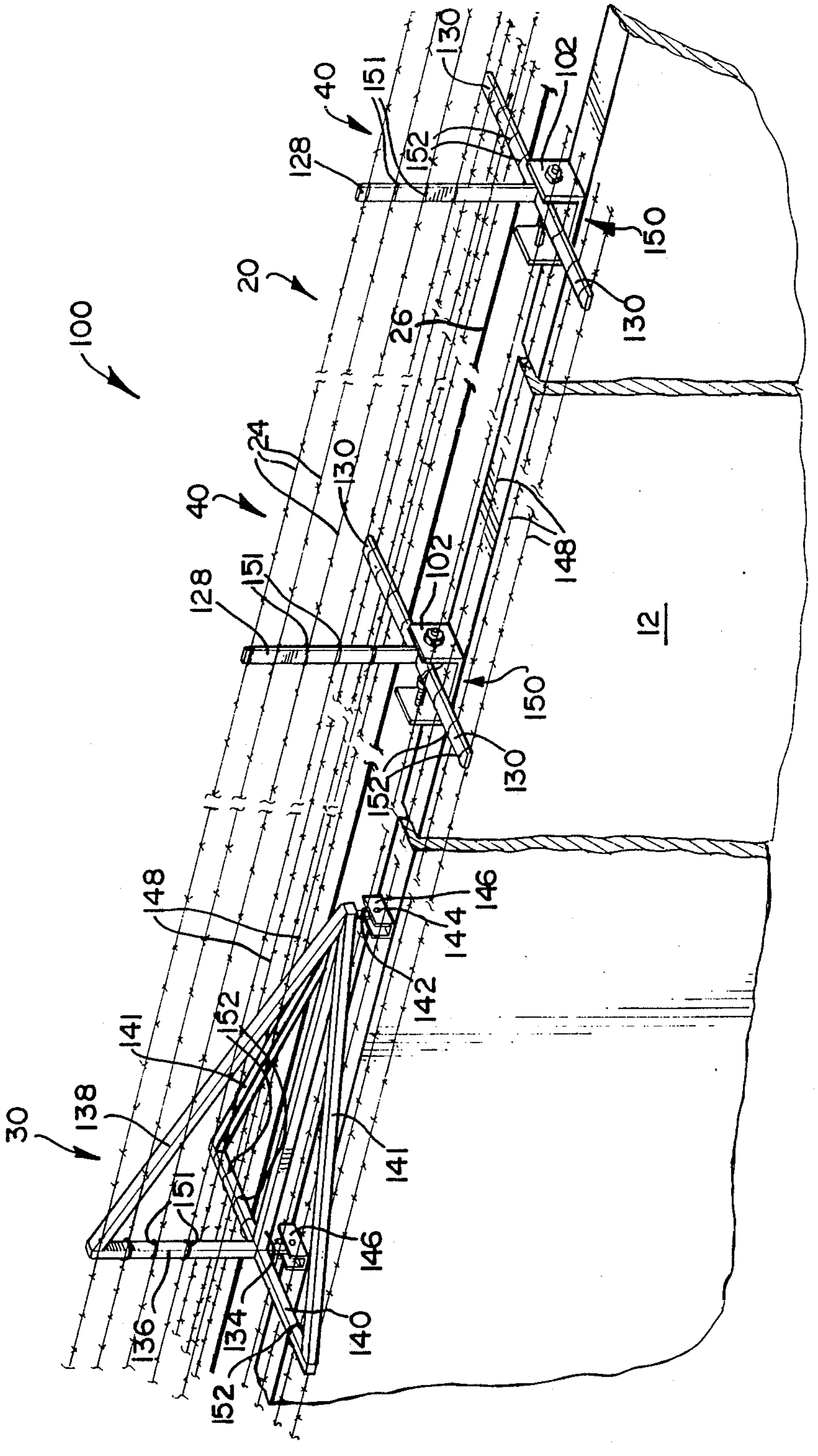
FIG. 4 shows a three-dimensional view of part of a security installation according to another embodiment of the invention.
Figure 5:
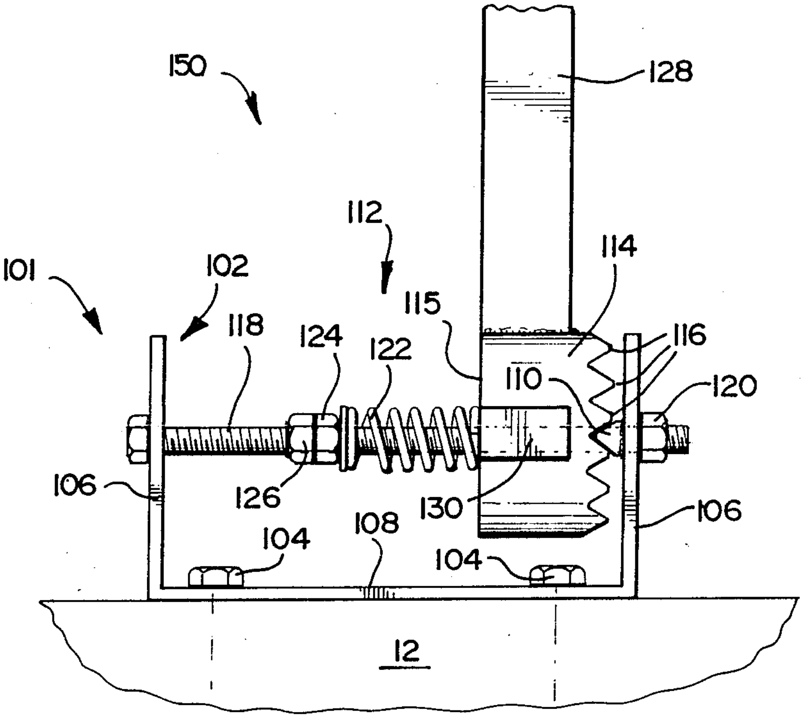
FIG. 5 shows a side view of one of the warning signal emission means of FIG. 4.
Figure 6:
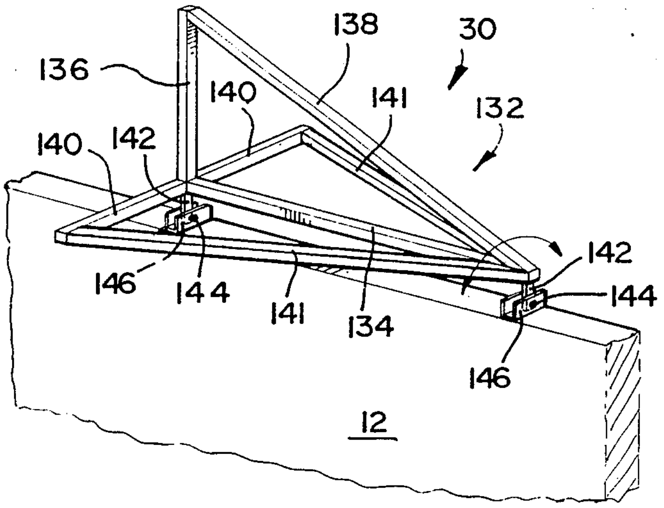
FIG. 6 shows a three-dimensional view of a primary support of the security installation of FIG. 4.

Referring now to FIGS. 4 to 6 of the drawings, in which, unless otherwise indicated, the same reference numerals as used in FIGS. 1 to 3 are used to designate similar components, reference numeral 100 refers generally to a security installation in accordance with another embodiment.

The security installation 100 includes primary and secondary barrier sections 12 and 20, primary and secondary supports 30 and 40, and warning signal emission means 150. In this embodiment, the primary barrier section 12 is a wall.

As can best be seen in FIG. 5, each of the warning signal emission means or devices 150 comprises a first component 101 which includes a U-shaped channel member 102 secured to the top of the wall 12 by means of a pair of bolts 104. The channel member 102 comprises a pair of parallel transversely spaced upwardly directed flanges 106 connected together by a web 108, the bolts 104 passing through holes in the web 108. A pair of teeth 110 (one of which is shown in FIG. 5) project inwardly from an inner surface of one of the flanges 106.

The devices 150 also include a second component generally indicated by reference numeral 112. The second component 112 comprises a round cylindrical component 114 which has an end face 115 and which is provided with a plurality of circumferentially spaced longitudinally extending teeth 116 which engage the teeth 110. The second component 112 is secured to the first component 102 by means of a bolt 118 which passes through aligned holes in the flanges 106 and which is locked in position by means of a nut 120. The bolt 118 extends in the first direction and defines a pivotal axis, with the teeth 110 hence being spaced diametrically about the pivotal axis. The cylindrical component 114 is axially and pivotally displaceable on the bolt 118. The teeth 116 are urged into engagement with the teeth 110 by bias means in the form of a spring 122 extending around the bolt 118. The spring 122 is located between a nut 124 on the bolt 118, and the end of face 115 of the round cylindrical component 114. The nut 124 is locked in position by a lock nut 126.

In this embodiment, each secondary support 40 includes an upright support 128 connected to and projecting upwardly from the round cylindrical component 114. Each support 40 further includes a pair of diametrically opposed transverse supports 130 projecting transversely respectively on opposite sides of the upright supports 128.

Thus, the spring 122 biasses the teeth 116 into engagement with the teeth 110. However, on sufficient force being applied to the upright support 128 and/or one of the transverse supports 130 the component 114 can be urged to rotate relative to the first component 101 against the interlocking of the teeth 160, 110 and the bias of the spring 122, i.e. in ratchet-like fashion, thereby causing an aural and/or a vibration warning signal to be emitted.

The degree of pivoting of the second component 112 relative to the first component 101 is limited by the transverse members 130 which engage the top of the wall 12 or web 108 after a predetermined degree of rotation, e.g. when the upright member 128 has pivoted about 20 degrees off the vertical, in either direction.

By varying the position of the nut 124 the degree of compression of the spring 122 can be varied thereby also varying the force required to rotate the second component 112 relative to the first component 101. Typically, the degree of compression of the spring 122 is arranged such that rotation between the second component 112 and the first component 102 occurs on application of a load in the second direction, in excess of 30 kilograms to the outer end of the upper support 128 or one of the transverse supports 130.

As shown in FIG. 6, in this embodiment, each primary support 30 comprises a planar triangular frame 132 comprising a horizontal member 134, a vertical member 136 connected to and projecting upwardly from one end of the horizontal member 134, and a bracing member 138 interconnecting the remote ends of the horizontal and vertical members 134 and 136. The primary member 30 further includes a pair of transverse members 140 projecting transversely from opposite sides of the intersection between the horizontal and vertical members 134 and 136, and bracing members 141 interconnecting the remote ends of the transverse members 140 and the horizontal member 134. The primary support 30 includes a pair lugs 142 projecting downwardly from opposite ends of the horizontal member 134, the lugs 142 being pivotally mounted via pivot pins 144 to U-shaped channel members 146 mounted on the top of the wall 12. The pivot pins 144 extend in the first direction, thereby permitting pivoting of the primary support 30 in the second direction.

As described above, the secondary barrier section 20 includes a plurality of horizontally extending tensioned tie members, which may be strands of steel tie or span wires 24, spaced apart from one another vertically. In addition, the secondary barrier section 20 also includes a plurality of horizontally extending transversely spaced tensioned tie members 148. The tie members 148 extend between the transverse supports 130 and 140 of the supports 40 and 30 respectively. The tie members 24 are attached to the supports 128 by tie elements 151. Similarly the tie members 148 are attached to the supports 130, 140 by tie elements 152.

Figure 7:
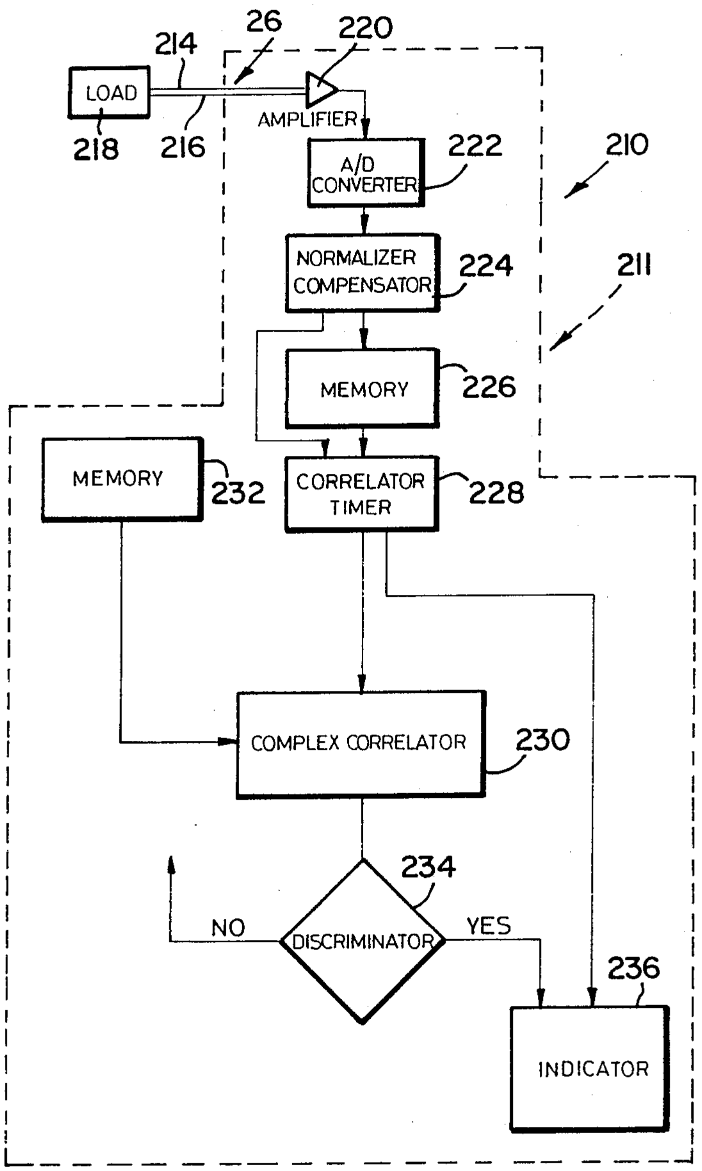
FIG. 7 shows a block diagram of a signal sensing device and signal processing means arranged as a protective device, and forming part of the security installations of FIGS. 1 and 4.

A microphonic co-axial cable 26 is provided and is connected to suitable signal processing means as described hereunder with reference to FIG. 7.

As a result of the triangular configuration of the members 134, 136, 138 and 134, 140, 141 the primary supports 30 cannot yield readily in the first direction permitting the wires 24, 148 to be tensioned to a substantial degree.

The security installation 100 of FIGS. 4 to 6 functions in substantially the same manner as that described above with reference to FIGS. 1 to 3, inclusive. Should an intruder attempt to penetrate the installation 100 the primary supports 30 may pivot in the second direction. However, they will not deform plastically and hence after the attempted breach has been investigated the secondary barrier section 20 can be reset to its original position.

Referring now to FIG. 7 of the drawings, reference numeral 210 generally indicates a protective device, which is similar to that described in U.S.A. Pat. No. 4 764 756. The device 210 includes the cable 26 of the security installations 10, 100, and signal processing means 211. The cable 26 comprises an inner conductor 214, and an outer conductor 216 located co-axially around the inner conductor 214 and insulated therefrom by means of di-electric material (not shown).

A mismatched load 218 is applied between the conductors 214, 216 at a first pair of ends of the conductors. To their other pair of ends there is connected an amplifier 220 which forms part of the signal-processing means 211. An analogue-to-digital (A/D) converter 222 is responsive to the amplifier 220, and to a normalizer/-compensator 224. A memory or other variable delay device 226 is response to the normalizer/compensator 224, and a correlator/timer 228 is responsive to the memory 226.

A complex correlator 230 is responsive to the correlator/timer 228, as well as to a memory 232. A decision-making device or discriminator 234 is responsive to the correlator 230, and a combined warning means/position indicator 236 is responsive to the discriminator 234. The indicator 236 is also responsive to the correlator/timer 228.

In use, an attempted breach of the installations 10, 100 will be sensed and analyzed substantially as described in U.S. Pat. No. 4 764 756.

I claim:

1. A security installation comprising a primary barrier section protruding upwardly from a substrate and extending along the substrate in a first direction;

a secondary barrier section protruding from and extending along said primary barrier section, said secondary barrier section including a plurality of spaced apart supports and horizontally extending tie members attached to said supports;

means pivotally mounting at least some of said supports to said primary barrier section on an axis parallel to said first direction, said means including bias means to resiliently permit a pivoting movement of at least one pivotally mounted support in a second direction extending transversely to said first direction; and sensing means for sensing movement in said first direction of at least a portion of said secondary barrier section containing a pivotal support relative to said primary barrier section.

2. A security installation as claimed in claim 1 in which said means for pivotally mounting a support includes warning signal emission means for emitting a warning signal in response to said portion of said secondary barrier section moving in said second direction relative to said primary barrier section; and wherein said installation further includes detection means for detecting a warning signal emitted by the warning signal emission means.

3. A security installation as claimed in claim 2, in which the warning signal emission means is adapted to issue signals in the form of vibrations as the secondary barrier section moves relative to the primary barrier section, with the detection means including a vibration signal sensing device, and with signal-processing means for receiving and further processing the signal sensed by the signal sensing device also being provided.

4. A security installation as claimed in claim 3, in which the signal sensing device is a microphonic cable extending along at least one of the barrier sections, with the microphonic cable comprising at least two elongate co-extensive electrical conductors capable of sensing vibrations, converting these vibrations into electrical signals and transmitting the electrical signals, and with the signal-processing means being electrically connected to at least one pair of ends of the conductors, the signal-processing means including normalizing means for normalizing the electrical signals, and a comparator comparing the normalized signals with previously normalized known signals, thereby to identify the source of the signals transmitted along the cable, with identification of signals as emanating from the warning signal emission means being indicative of an alarm condition.

5. A security installation as claimed in claim 2 wherein said warning signal emission means includes a first component mounted to said primary barrier section and a second component mounted to said secondary barrier section, said second component being pivotal relative to first component about said axis extending in said first direction, and with the warning signals being emitted as said second component pivots relative to said first component.

6. A security installation as claimed in claim 5, in which the warning signal emission means also comprises a plurality of teeth on the second component and spaced circumferentially about the pivotal axis and at least one complementary teeth-engaging member on the first component with said bias means biassing the teeth-engaging member of the first component and the teeth of the second component into engagement with each other.

7. A security installation as claimed in claim 1, in which the secondary barrier section also comprises a pair of transverse supports projecting transversely respectively on opposite sides of at least some of the upright supports, and a plurality of tie members spaced transversely apart, extending between the transverse supports.

8. A security installation as claimed in claim 5, in which the warning signal emission means further includes limiting means for limiting the extent to which the second components can pivot relative to the first components.

9. A security installation as claimed in claim 8, in which the limiting means is adapted to permit pivoting of the upright supports up to 20° off the vertical.

10. A security installation as claimed in claim 5 wherein said supports are of elongate form, and said bias means permits pivoting of said second component relative to said first component under a load of at least 20 kg being applied to a free end of one of said supports in said second direction.

11. A security installation as claimed in claim 6, in which a plurality of the teeth-engaging members are provided on the first component, with the members being in the form of circumferentially spaced teeth.

12. Warning signal emission means for a security installation comprising a primary barrier section protruding upwardly from a substrate end extending along the substrate in a first direction, and a secondary barrier section protruding from, and extending along, the primary barrier section, the warning signal emission means comprising

- a first component mountable to one of the barrier sections;
- a second component mountable to the other of the barrier sections, and being pivotal relative to the first component about a pivotal axis;
- a plurality of teeth on the second component and spaced apart circumferentially about the pivotal axis;
- at least one complementary teeth-engaging member on the first component; and
- bias means resiliently biassing the teeth of the first component and the member of the second component into engagement with each other.

13. A security installation which includes

- a primary barrier section protruding upwardly from a substrate and extending along the substrate in a first direction;
- a second barrier section protruding from, and extending along, the primary barrier section, with the secondary barrier section being pivotal with respect to the primary barrier section in a second direction about a pivotal axis extending in the first direction, the secondary barrier section comprising a plurality of upright supports, spaced apart along the primary barrier section, a plurality of vertically spaced tie members extending between the upright suuports, pairs of transverse supports projecting transversely respectively on opposite sides of at least some of the upright supports, and a plurality of spaced tie members extending between the transverse supports;
- a warning signal emission means associated with at least some of the upright supports, each warning signal emission means including a first component mounted to the primary barrier section; a second component connected to an upright support of the secondary barrier section, with the second component being pivotal relative to the first component about the pivotal axis; a plurality of teeth on the second component spaced circumferentially about the pivotal axis; at least one complementary teeth-engaging member being provided on the first component; and bias means biasing the teeth-engaging member of the first component and the teeth of the second component into engagement with each other so that warning signals in the form of vibrations are emitted as the second component pivots relative to the first component; and
- detection means for detecting warning signals emitted by the warning signal emission means.

14. A security installation as claimed in claim 13, in which the warning signal emission means further includes limiting means for limiting the extent to which the second components can pivot relative to their first components.

15. A security installation as claimed in claim 14, in which the limiting means is adapted to permit pivoting of the upright supports up to 20° off the vertical.

16. A security installation as claimed in claim 14, in which the upright and transverse supports are of elongate form, and the teeth, teeth-engaging member and the bias means are such that pivoting of the second component relative to the first components occurs on a load of at least 20kg being applied to a free end of one of the supports in the second direction.

17. A security installation as claimed in claim 13, in which a plurality of the teeth-engaging members are provided on the first component, with the members being in the form of circumferentially spaced teeth.

18. A security installation as claimed in claim 13, in which the detection means includes a microphonic cable extending along at least one of the barrier sections, with the microphonic cable comprising at least two elongate co-extensive electrical conductors capableof sensing vibrations, converting these vibrations into electrical signals and transmitting the electrical signals, the installation also including signal-processing means for receiving and further processing the electrical signals, electrically connected to at least one pair of ends of the electrical conductors, the signal-processing means including normalizing means for normalizing the electrical signals, and a comparator comparing the normalized signals with previously normalized known signals, thereby to identify the source of the signals transmitted along the cable, with identification of signals as emanating from the warning signal emission means being indicative of an alarm condition.

19. A security installation which includes a primary barrier section protruding upwardly from a substrate and extending along the substrate in a first direction;

a secondary barrier section comprising an upright portion which protrudes upwardly from the first barrier portion and at least one transverse portion projecting transversely from the upright portion, the upright portion and transverse portion extending in the first direction, with the secondary barrier section being pivotal relative to the first barrier section about a pivotal axis extending in the first direction;

warning signal emission means for emitting a warning signal on the second barrier section pivoting relative to the first barrier section; and detection means for detecting a warning signal emitted by the warning signal emission means.

20. A security installation as claimed in claim 19, in which the warning singal emission means includes a first component mounted to the primary barrier section, and a second component mounted to the secondary barrier section, with the second component being pivotal relative to the first component about the pivotal axis so that warning signals are emitted as the second component pivots relative to the first component.

21. A security installation as claimed in claim 20, in which the secondary barrier section includes two transverse portions projecting respectively from oppoiste sides of the upright portion.

22. A security installation as claimed in claim 21, in which the upright portion comprises a plurality of upright supports, spaced apart along the primary barrier sections, and a plurality of vertically spaced tie members extending between the upright supports, and in which the transverse portions each comprise transverse supports projecting transversely from at least some of the upright supports, and plurality of spaced tie members extending between the transverse supports, with a warning signal emission means being associated with at least some of the upright supports, the second components of the warning signal emission means in each case being attached to an upright support.

23. A security installation as claimed in claim 19, in which the warning signal emission means is adapted to issue signal in the form of vibrations as the secondary barrier section moves relative to the primary barier section, the detection means comprising a microphonic cable extending along at least one of the barrier sections, with the microphonic cable comprising at least two elongate co-extensive electrical conductors capable of sensing vibrations, converting these vibrations into electrical signals and transmitting the electrical signals, the installation also including signal-processing means electrically connected to at least one pair of ends of the electrical conductors, the signal-processing means including normalizing means for normalizing the electrical signals, and a comparator comparing the normalized signals with previously normalized known signals, thereby to identify the source of the signals transmitted along the cable, with identification of signals as emanating from the warning signal emission means being indicative of an alarm condition.

24. A security installation with includes a primary barrier section protruding upwardly from a substrate and extending along the substrate in a first direction;

a second barrier section protruding from, and extending along, the primary barrier section, with the secondary barrier section being pivotal with respect to the primary barrier section in a second direction about a pivotal axis with extends in the first direction;

at least one warning signal emission means for emitting a warning signal on the secondary barrier section pivoting in the second direction relative to the primary barrier section, the warning signal emission means comprising a first component mounted to the primary barrier section;

a second component mounted to the secondary barrier section and being pivotal relative to the first componnet about the pivotal axis;

a plurality of teeth on one of the components and spaced apart circumferentially about the pivotal axis;

at least one complementary teeth-engaging member on the other of the components; and bias means resiliently biasing the first and second components axially towards one another to bias the teeth of said one component and the teeth-engaging member of said other component releasably into engagement with each other so that a warning signal is emitted as the secondary barrier section pivots relative to the primary barrier section; and detection means for detecting a warning signal emitted by the warning signal emission means.

25. A security installation as claimed in claim 24, in which the secondary barrier section comprises plurality of upright supports, spaced along the primary barrier section, and a plurality of vertically spaced tie members extending between the upright supports, with a warning signal emission means being associated with at least some of the upright supports, the second component of the warning signal emission means in each case being attached to the upright supports.

26. A security installation as claimed in claim 25, in which the secondary barrier section also comprises a pair of transverse supports projecting transversely respectively on opposite sides of at least some of the upright supports, and a plurality of tie members spaced transversely apart, extending between the transverse supports.

27. A security installation as claimed in claim 26, in which the upright and transverse supporst are of elongate form, and the teeth, teeth-engaging member and bias means are such that pivoting of the second component relative to the first component occurs on a load of at least 20kg being applied to a free end of one of the supports, in the second direction

28. Warning signal emission means for a security installation comprising a primary barrier section protruding upwardly from a substrate and extending along the substrate in a first direction, and a secondary barrier section protruding from, and extending along, the primary barrier section, the warning signal emission means comprising a first component mountable to the primary barrier section;

a second component mountable to the secondary barrier section, and being pivotal relative to the first component about a pivotal axis;

a plurality of teeth on one of the components and spaced apart circumferentially about the pivotal axis;

at least one complementary teeth-engaging member on the other of the components; and bias means resilient biasing the first and second components axially towards one another to bias the teeth of said component and the teeth-engaging member of said other components releasably into engagement with each other.

29. Warning signal emission means as claimed in claim 28, in which the pivotal axis is defined by a pivot pin on which at least one of the components is mounted for both pivotal and axial displacement, the bias means including a coil spring mounted in compression on the pivot pin.

30. Warning signal emission means as claimed in claim 29, in which the degree of compression of the coil spring is adjustable.

31. Warning signal emission means are claimed in claim 30, in which the coil spring is mounted between said one component and a stop on the pivot pin, the stop being axially displaceable along the pivot pin to adjust the degree of compression of the spring.

* * * * *